United States Patent [19]

Silverman

[11] 4,220,865

[45] Sep. 2, 1980

[54] ULTRAVIOLET CURING OVEN WITH ROTABLE LAMP ASSEMBLY

[75] Inventor: Stanley Silverman, Denville, N.J.

[73] Assignee: Sun Chemical Corporation, New York, N.Y.

[21] Appl. No.: 963,370

[22] Filed: Nov. 24, 1978

[51] Int. Cl.[2] .................... G01J 1/00

[52] U.S. Cl. .................... 250/504 R; 34/4; 250/341; 250/493

[58] Field of Search .................... 362/254; 250/504, 341; 254/493; 34/1, 4

[56] References Cited

U.S. PATENT DOCUMENTS

| | | | |
|---|---|---|---|
| Re. 29,590 | 3/1978 | Whelan | 250/493 |
| 341,620 | 5/1886 | Woolley | 362/254 |
| 1,845,399 | 2/1932 | Cloninger | 362/254 |
| 3,433,949 | 3/1969 | Truhan | 250/504 |
| 3,950,650 | 4/1976 | Pray et al. | 250/504 |
| 4,143,278 | 3/1979 | Koch | 34/1 |

*Primary Examiner*—Harold A. Dixon

*Attorney, Agent, or Firm*—Cynthia Berlow

[57] ABSTRACT

An oven for curing ultraviolet curable ink on cylindrical objects consists of an assembly of two pairs of elongated ultraviolet lamps with respective reflectors for directing the radiation of the respective pairs of lamps toward the path taken by the objects to be cooled. The assembly is rotatable to move either of the pair of lamps into operative curing position and to enable maintenance on the other two lamps or the lamp power supplies at a convenient time as when other maintenance is required rather than force immediate shutdown of the decorating/printing and curing line. Air flow paths are provided to cool the lamps and reflectors during high power operation and to enable the lamp to stay hot during low power operation. A plurality of spindles which carry the cans to be cured are fixed on the pins of a pin chain and move over a wire brush type rack to cause the spindles and then the cans on the spindles to rotate as they move under and along the length of the lamps.

12 Claims, 23 Drawing Figures

251
64
40
42
41
41
45
46
44
2
2
43

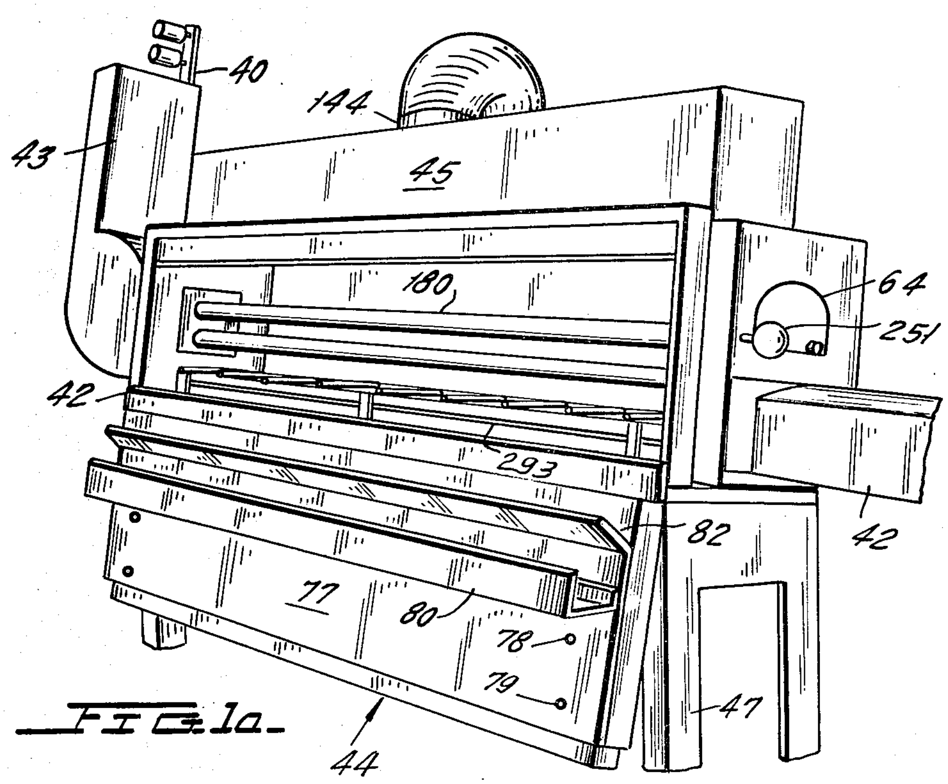
FIG. 1a
FIG. 19
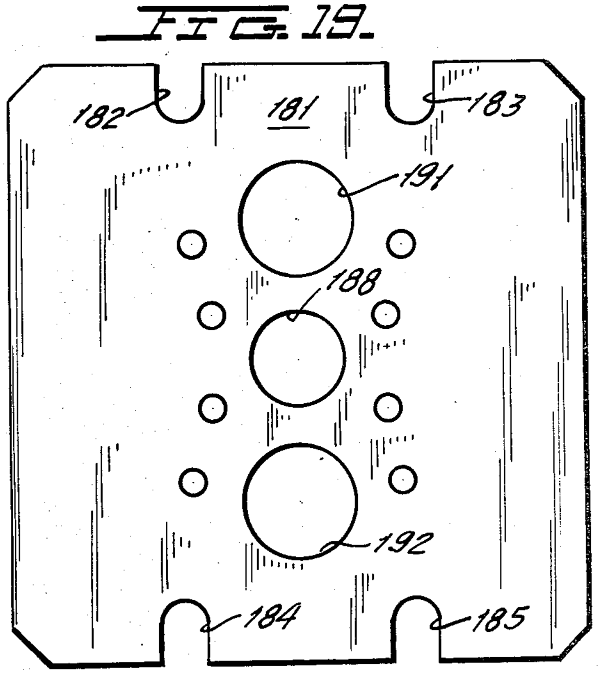
FIG. 21
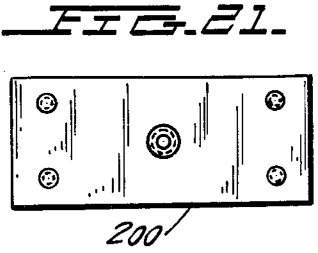
FIG. 20
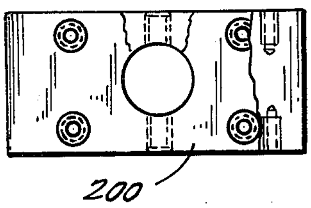

45
140
141
142
144
220
223
224
5
16

230
235
236
237
238
240
241
18
18a

ULTRAVIOLET CURING OVEN WITH ROTABLE LAMP ASSEMBLY

BACKGROUND OF THE INVENTION

Ultraviolet curing ovens for curing ultraviolet curable inks on cylindrical objects are well known. One such oven is shown in U.S. Pat. No. Re. 29,590 in the name of Whelan and assigned to the assignee of the present invention. The oven of that patent contains an elongated ultraviolet lamp disposed above a pin chain which carries coated cans beneath the lamp on a path which is at a slight angle to the lamp. The cans are caused to rotate on their axis as they move under the lamp and the axis of the cans is generally perpendicular to the lamp axis. A reflector above the lamp then produces a focused line of ultraviolet radiation which, in effect, spirals around the full length of the cans as they move through the oven.

Ovens of this type have been used successfully. However, like most presently available ultraviolet ovens, the amount of radiation available per square inch is limited, and the oven must be taken out of service to perform maintenance on the lamp.

BRIEF DESCRIPTION OF THE PRESENT INVENTION

In accordance with the present invention, a novel ultraviolet oven is provided wherein two pairs of parallel elongated lamps with respective reflectors are provided on a common rotatably mounted support. The reflector and lamps of each pair are rotatable to respective positions above the path taken by rotating spindles of a pin chain which moves through the oven with ultraviolet decorated cans suspended from and rotating on the pin chain. The oven is about 7 feet long and the cans rotate through about two full rotations as they pass through the oven. The reflectors are preferably parabolic and direct parallel light rays toward the cans, rather than a skewed focused line of radiation. The cans are exposed to about 300 watts per square inch within the oven so that the ultraviolet decoration is completely cured when the cans leave the oven. The oven can cure decorated cans moving through the oven at rates up to and possibly in excess of 900 cans per minute.

A novel air control system is provided in combination with a lamp power control system such that a strong air flow moves past the lamps and reflectors to cool the reflectors and remove ozone when the lamps are operated at full power. When, however, the line stops the lamp power is reduced to standby power, sufficient to keep the lamps ignited, and cooling air is diverted from the lamps to prevent their cooling and possible turning off during standby conditions.

In order to rotate the pin chain spindles as they move through the oven, and thus rotate the cans, a novel stationary metal brush rack is provided to ensure contact with the spindles, even though the spindles may be slightly out of line in a way that they or any of them would not contact a rigid rack structure.

An important feature of the invention is that either pair of lamps and reflectors can be quickly rotated into position relative to the can path. Thus, if there is a failure of one of the lamps, or some malfunction in connection with the lamp and reflector structure in use, the assembly can be easily rotated to bring a new set of lamps and reflectors in place. The former pair of lamps and reflectors can then be repaired or replaced at leisure and without shutdown of the can line.

The entire oven assembly is simple in construction and can be easily maintained and all parts are easily accessible. Included in the assembly is a novel reflector carried on the front panel which reflects radiation from the lamp assembly toward the bottom of the can. In addition, two spaced air conduits extend along the length of the can path adjacent the opposite ends of the cans in the path. One of these conduits applies an air jet against the closed bottom of the can to hold the can on its spindle. The other conduit acts as a sliding stop for the open can end and keeps the can bottom from hitting the free end of the spindle. Air jets from this latter conduit cool the spindle and stationary wire rack which rotates the spindles. An air slot between reflectors performs multiple functions. Air is blown against cans to ensure contact between cans and rotating pins and to cool the cans in standby. This air also cools the reflectors.

BRIEF DESCRIPTION OF THE DRAWINGS

FIG. 1*a* is a perspective view of the apparatus of the invention with the side cover in the open position.

FIG. 19 is a plan view of one of the main mounting plates for mounting the rotatable reflector assembly.

FIG. 20 is a plan view of one of the mounting blocks which is secured to the mounting plate of FIG. 19.

FIG. 21 is a top view of FIG. 20.

DETAILED DESCRIPTION OF THE DRAWINGS

Figure 1:
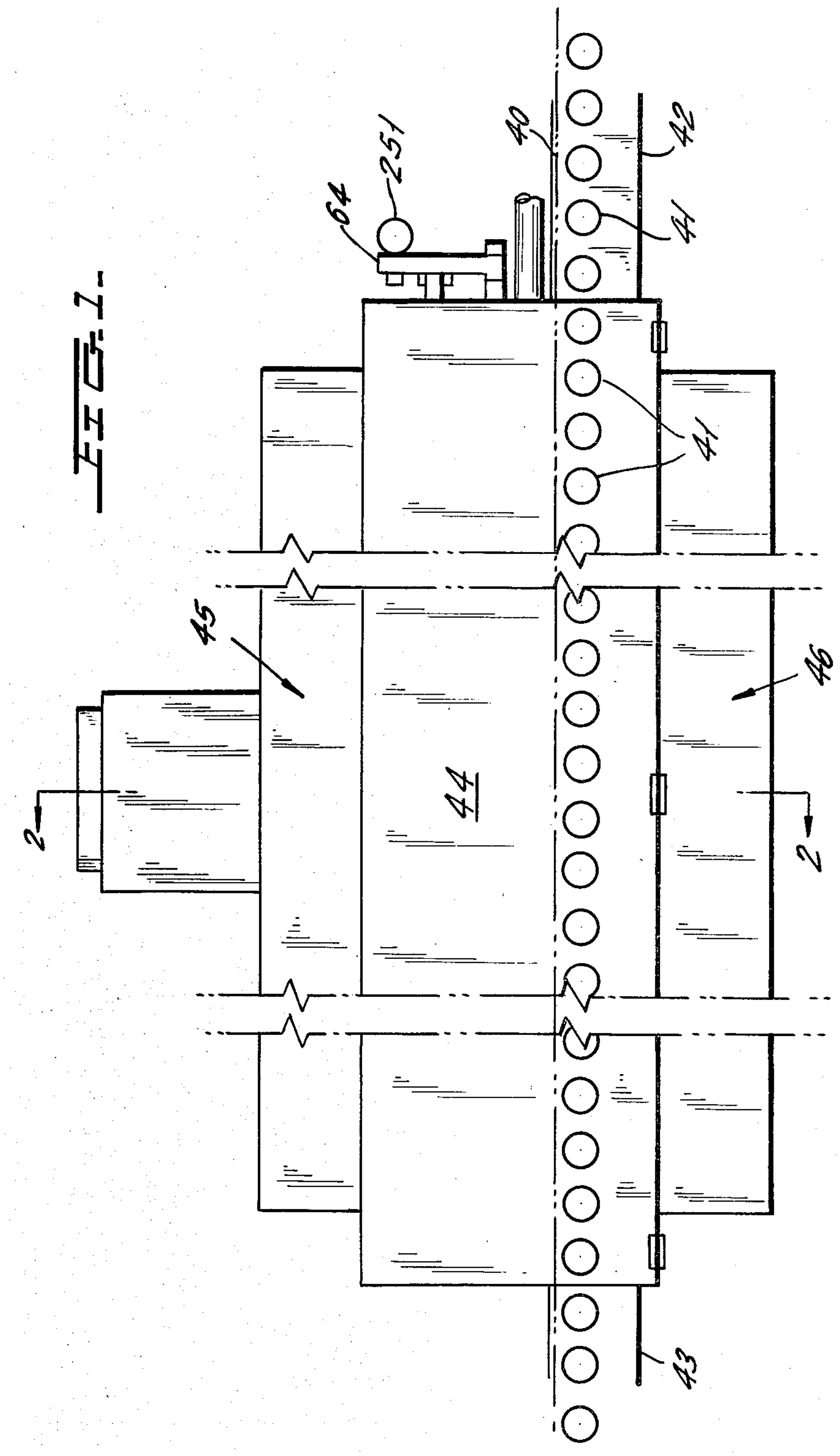
FIG. 1 is a front elevation view of the apparatus of the present invention.

Referring first to FIGS. 1 and 1*a*, there is illustrated therein in elevation and perspective view, respectively, the novel oven of the present invention.

As schematically illustrated in FIG. 1, the oven receives a chain 40 which carries pins in the manner disclosed in above U.S. Pat. No. Re. 29,590, which pins in turn carry a plurality of cans which have been decorated by a suitable printing and/or coating mechanism, which decoration must be cured by exposure to ultraviolet radiation. The cans are schematically illustrated in FIG. 1 as cans 41. The cans are introduced to the oven through an input shroud or sleeve 42 which prevents leakage of ultraviolet radiation from the interior of the oven and they exit through a similar sleeve or shroud 43. The oven structure contains, as shown in FIG. 1, a side wall 44 which is hinged at its bottom and can be opened to the open position shown in FIG. 1*a*. As will later be described in detail, cooling air and exhaust air are controlled within the body of the oven with the assistance of the upper plenum chamber 45 and bottom plenum chamber 46.

The entire oven assembly is mounted on a suitable structural steel frame 47 shown in FIG. 1*a* which tilts the oven assembly at an angle of about 10° to the horizontal so that the pins traveling through the oven will be at a slight pitch to prevent cans from walking off the pins. This angle is matched to the angle of the pins on the conventional pin chain.

Figure 2:
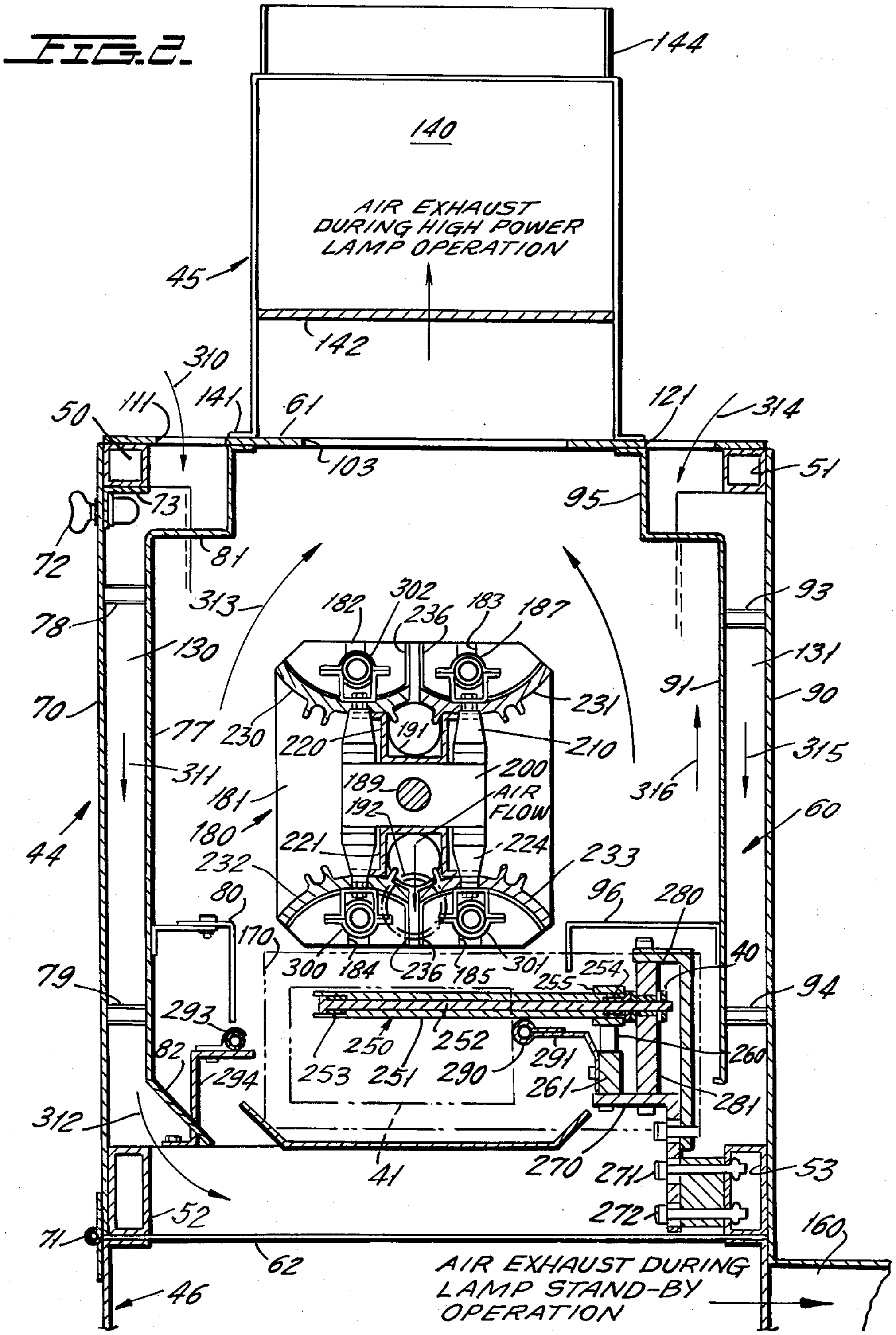
FIG. 2 is a cross-sectional view of the arrangement of FIG. 1 seen from the section line 2—2 in FIG. 1.
Figure 3:
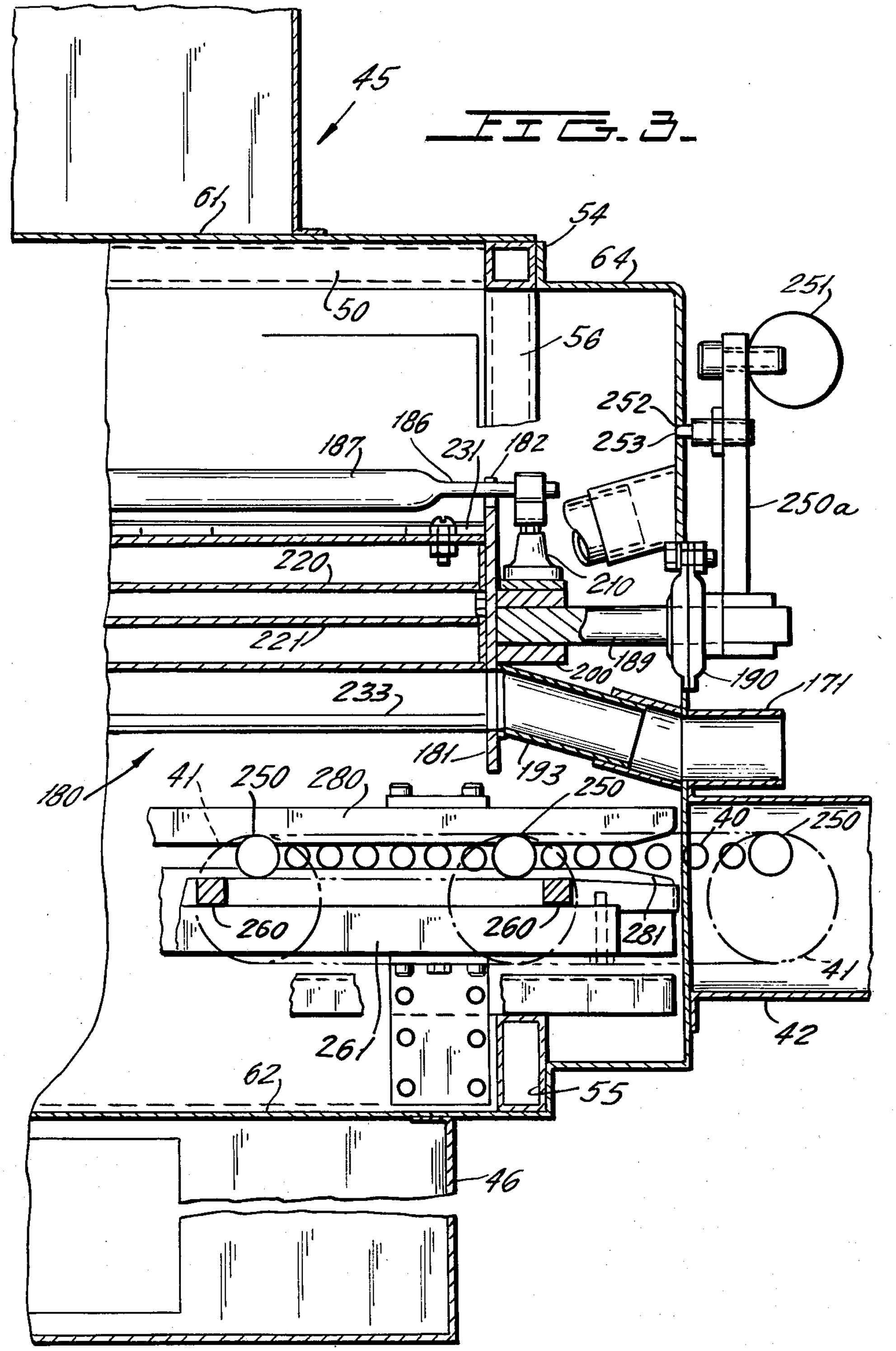
FIG. 3 is a longitudinal cross-sectional view through one end of the arrangement of FIGS. 1 and 2.

The main oven chamber is formed of sheet metal walls which are carried on a suitable structural steel frame. Thus, as shown in FIGS. 2 and 3 a rectangular frame is formed of structural steel members 50 to 53 (FIG. 2) with suitable cross members such as the cross members 54 and 55 shown in FIG. 3 and similar cross members at the opposite end of the oven. Suitable upright cross members such as the member 56 (FIG. 3) are also provided.

The oven chamber is enclosed by the two side members 44 and 60 (FIG. 2), the top and bottom members 61 and 62 (FIGS. 2 and 3) and end members including the end member 64 shown in FIG. 3.

Figure 13:
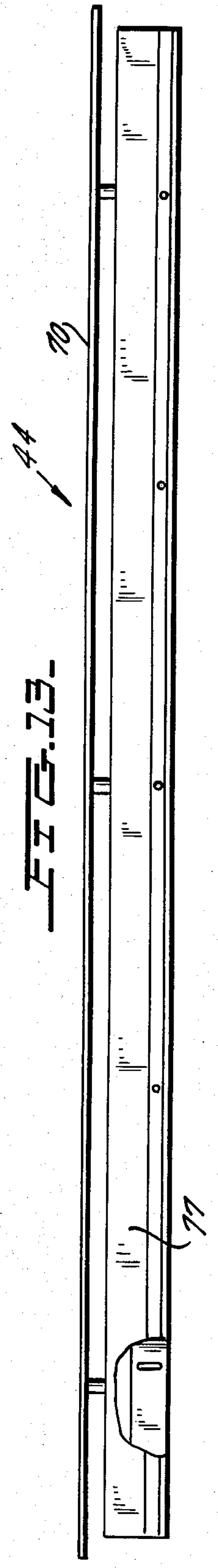
FIG. 13 is a top view of FIG. 12.
Figure 12:
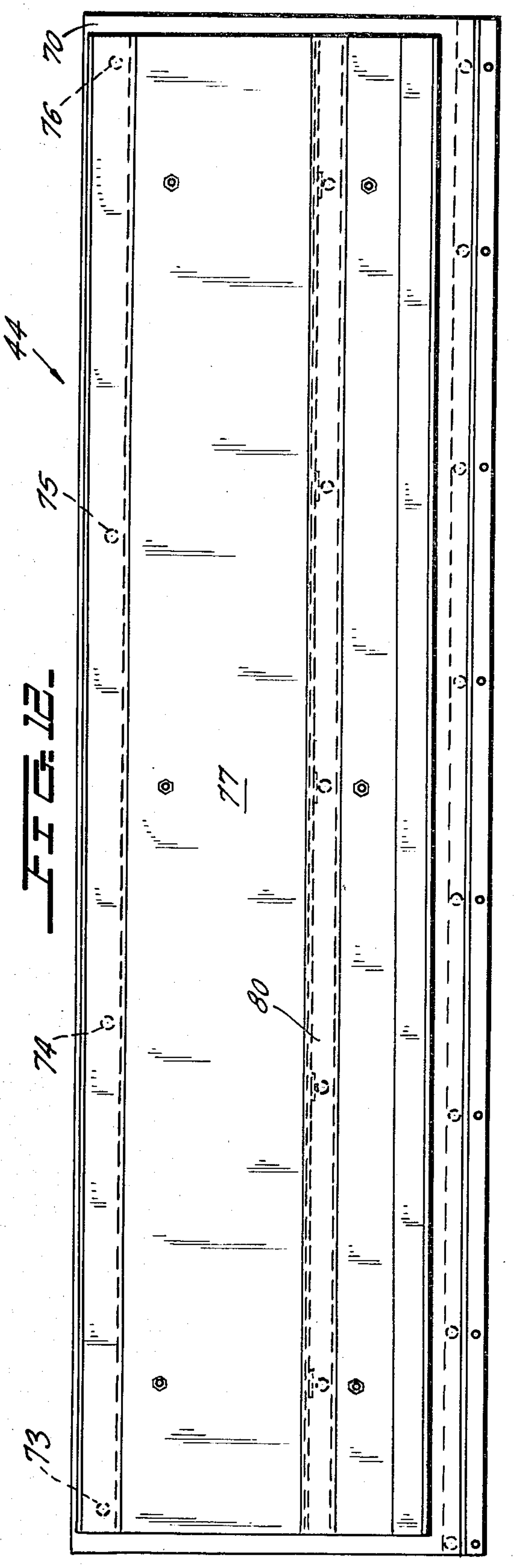
FIG. 12 is a front view of the side cover and baffle subassembly which can be open to expose the interior of the oven.

Side cover 44 is shown in detail in FIGS. 12 and 13 and consists of a sheet metal main body section 70 which is hinged at its bottom by the hinge 71 (FIG. 2) to the frame member 52 and to the bottom plenum 46. The upper portion of member 70 is provided with thumb screw latching members such as the latching member 72 in FIG. 2 which enable the cover to be latched in the raised position shown in FIG. 2 by latching into the angle latch plate 73 which is fixed to the frame support member 50. FIG. 12 illustrates four locations 73 to 76 for receiving these latching members.

The inside surface of member 70 then supports metal sheet 77 by a suitable spacer bolt arrangement including the spacer bolts 78 and 79 shown in FIG. 2. Sheet 77 defines an air channel with cover 44 and helps keep a cool outer surface for the oven. An elongated sheet 80 of reflecting material, such as Alzac with its bright side facing outwardly, is then supported from sheet 77 by any desired bolt arrangement or the like. As will be later seen, member 80 assists in reflecting radiation toward the bottom of a can which moves through the oven.

The upper portion of member 77 is fitted with an angle member 81 to help enclose the oven chamber and its bottom has an inwardly turned section 82. As will be later seen there are several air passages defined by the member 77 which help to control the movement of cooling air through the oven.

Side wall member 60 shown in FIG. 2 has a construction generally similar to that shown for side wall 44 except that the wall is fixed. If desired, side wall 60 can be opened like wall 44. The wall 60 consists of a main sheet metal member 90 which has an internal sheet member 91 spaced therefrom and secured thereto by the spacer bolts 93 and 94. Member 91, like member 77, helps define a cooling air path adjacent wall member 60 and helps to keep the outer surface of the oven cool. The upper portion of member 91 has the angle member 95 connected thereto to complete the definition of an air channel which will be later described.

A fixed reflector section 96 extends from and is supported by member 91 to assist in deflecting radiation toward cans which move through the oven as will be later described. This also reduces radiation and heating of the chain, brush and spindle assembly.

Figure 6:
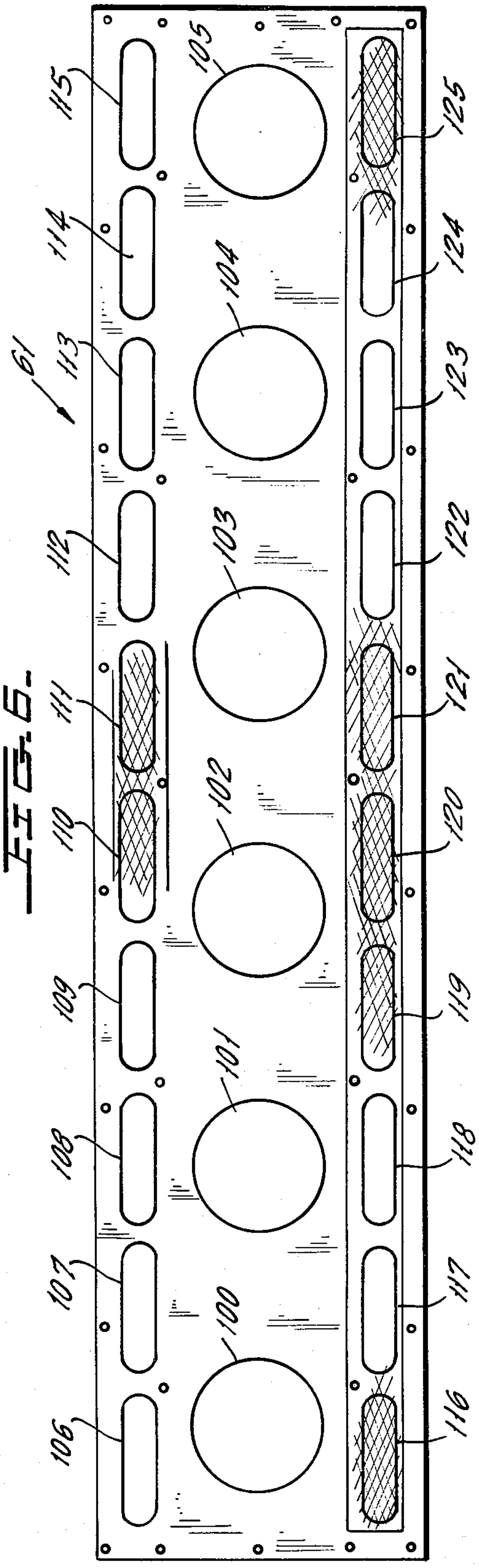
FIG. 6 is a top view of the top cover of FIG. 2.

The top cover 61 shown in FIGS. 2 and 3 is also shown in detail in FIG. 6. As shown in FIG. 6, the top cover contains a plurality of air openings 100 to 105 with opening 103 visible in FIG. 2. These openings define the main air flow channel through the oven body. The outer edges of member 61 also contain smaller openings or aligned slots which may be covered with a mesh, if desired, such as the openings 106 to 115 and 116 to 125. Note in FIG. 2 that the opening 111 (as well as all of the other openings 106 to 115) are aligned with the top of the air channel 130 formed between cover members 70 and 77 while the slots 116 to 125 will be aligned with the air flow channel 131 formed between members 90 and 91. The top cover 61 is held in place by suitable screws or the like which fix the cover to the frame members 50 and 51 and the cross members associated therewith at the ends of the oven.

Figures 4, 5, 14, 15, 16:
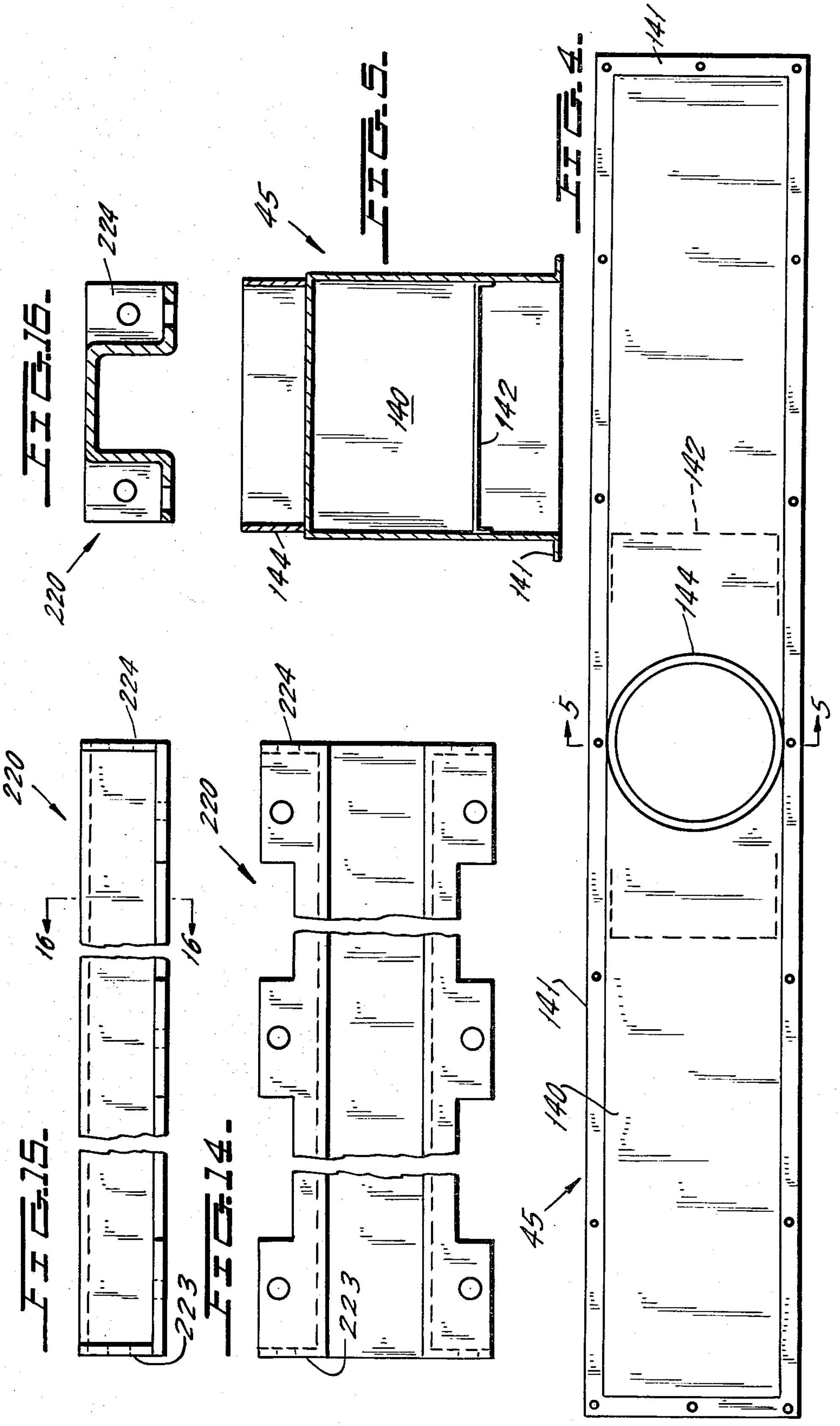
FIG. 4 is a top view of the top plenum of FIG. 2.
FIG. 5 is a cross-sectional view of the top plenum of FIG. 4 taken across the section line 5—5 in FIG. 4.
FIG. 14 is a top view of the reflector support bracket.
FIG. 15 is a front view of FIG. 14.
FIG. 16 is a cross-sectional view of FIG. 15 taken across the section line 16—16 in FIG. 15.

A top plenum 45 is then fixed atop the cover 61 where the plenum 45 is shown in more detail in FIGS. 4 and 5. The plenum consists simply of an elongated chamber 140 of suitable sheet metal which has a lower flange 141 which is bolted or otherwise fixed to the top cover 61.

A baffle 142 of relatively short length extends across the short length of the interior of chamber 140 and disposed beneath the cylindrical outlet 144 of the plenum and causes relatively even air flow upwardly through the oven along the length of the oven.

Figure 7:
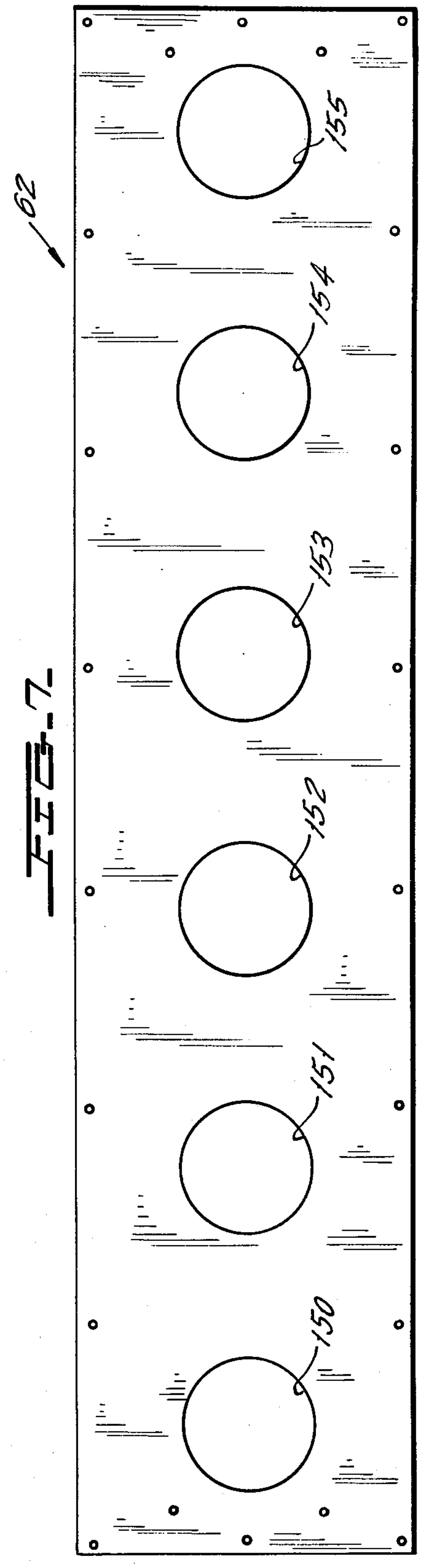
FIG. 7 is a top view of the bottom baffle in FIG. 2.

The bottom cover 62 is shown in detail in FIG. 7 and consists of a simple flat plate which contains a plurality of openings 150 to 155 which extend across and along the bottom of the oven chamber. Cover 62 is fixed to the oven as by bolting or otherwise securing the member to the frame members 52 and 53 and the cross frame elements at the opposite ends of the oven.

Figure 8:
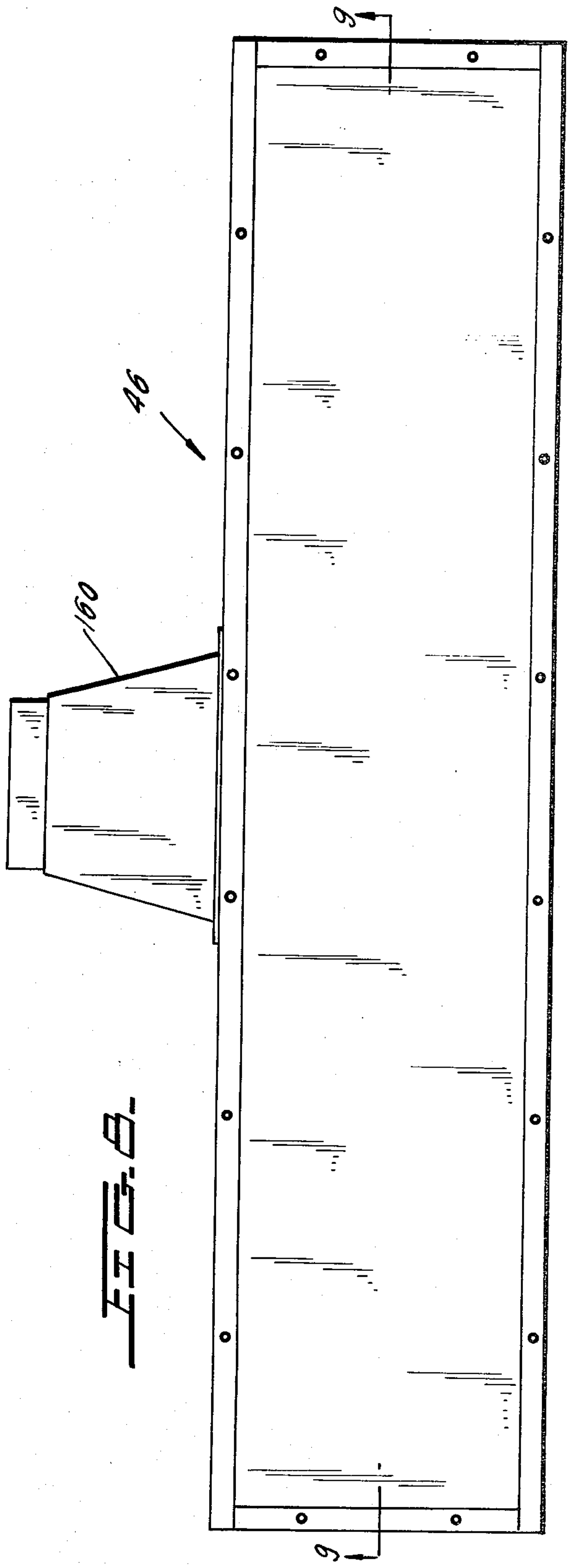
FIG. 8 is a top view of the bottom plenum assembly of FIG. 2.
Figure 9:
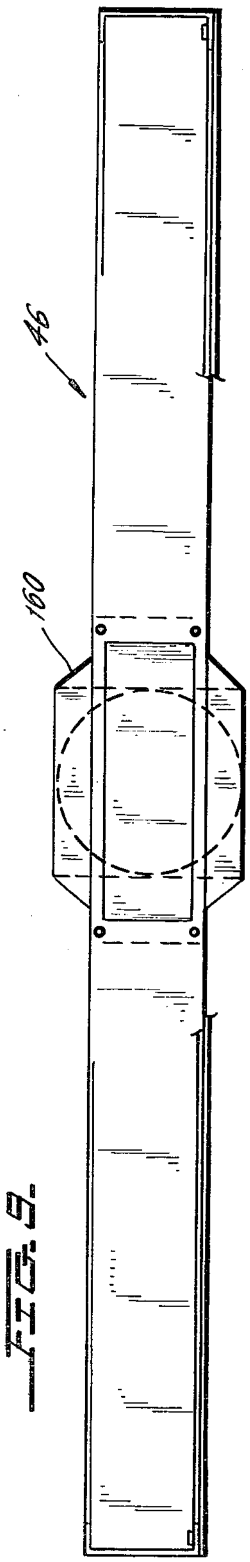
FIG. 9 is a cross-sectional view of FIG. 8 taken across the section line 9—9 in FIG. 8.

A bottom plenum assembly is then fixed to the bottom cover 62 and consists of the assembly 46 which is shown in detail in FIGS. 8 and 9. As shown in FIGS. 8 and 9 the plenum chamber 46 consists simply of an enclosed volume formed of sheet metal members. Chamber 46 has a side outlet 160 which leads to the air control system.

The ends of the oven are enclosed by end sheet metal cover members. The end cover member 64 shown in FIG. 3 is also shown in detail in FIGS. 10 and 11.

Figure 10:
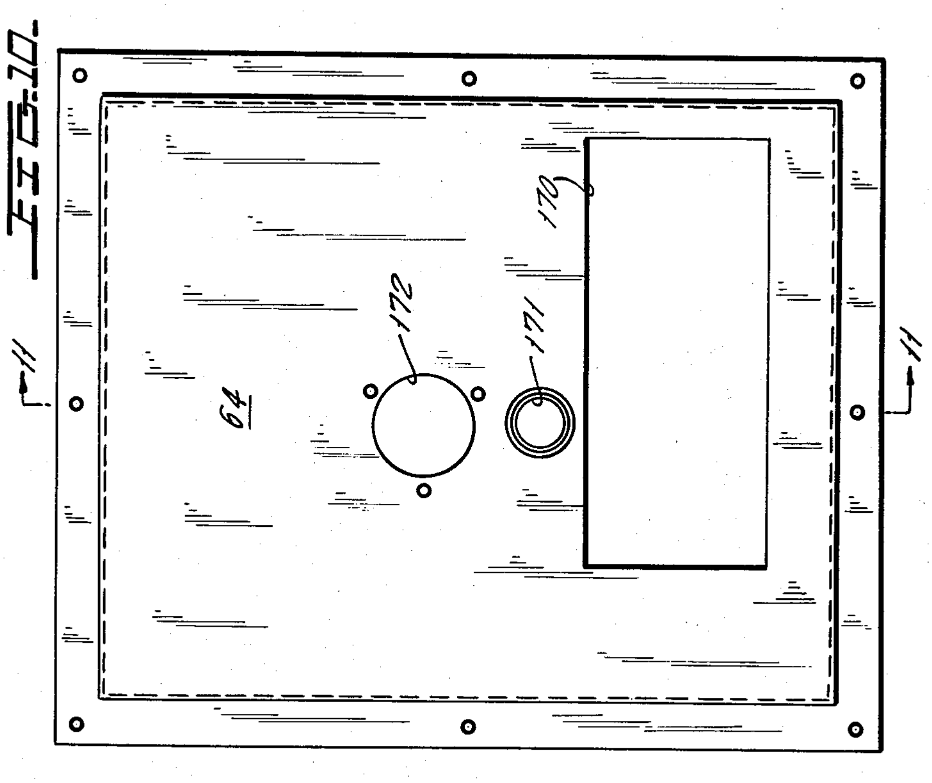
FIG. 10 is a front view of the end cover of FIG. 2.
Figure 11:
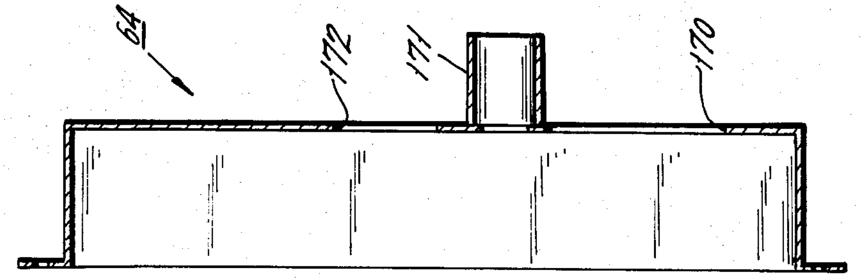
FIG. 11 is a cross-sectional view of FIG. 10 taken across the section line 11—11 in FIG. 10.

As shown in FIG. 10, the end wall member 64 contains a slot 170 having dimensions suitable for accepting the pin chain and cans supported thereby which are to move through the oven. End wall 64 also contains a cylindrical air inlet connection 171 and an opening 172 which receives the control shaft for rotating the reflector assembly which is contained within the oven as will be later described.

The opposite end wall (not shown) may be a simple flat sheet metal enclosure member which is secured across the end of the oven which is opposite to the end shown in FIG. 3. An exit slot will be formed in the opposite end wall to permit exit of the pin chain and cans carried thereby. The end walls will each have appropriate means for pivotally mounting the opposite end of the reflector assembly which will be later described.

The rotatable reflector assembly of the invention is generally illustrated in FIGS. 2 and 3 as the rotatable reflector assembly 180. The reflector assembly is mounted between two mounting plates at the opposite ends of the assembly. One of the mounting plates is shown as mounting plate 181 in FIG. 3 and an identical mounting plate will be formed at the opposite end of the assembly. Mounting plate 181 is shown in detail in FIG. 19 and contains four cutouts 182 to 185 which will receive the necks of respective ultraviolet tubes associated with the mounting plate. Thus, FIG. 3 shows the narrow neck 186 of a typical ultraviolet lamp 187 disposed within the notch 182 in the mounting plate 181.

Mounting plate 181 also contains a central opening 188 which receives the flush end of a mounting shaft 189 (FIGS. 2 and 3) which is rotatably mounted in a suitable mounting bearing 190 (FIG. 3) fixed to end wall member 64.

Mounting plate 181 also contains two openings 191 and 192 which are disposed in communication with the tube 193 (FIG. 3) which is in turn in communication with the air inlet 171. A tube having air outlets along its length extends from tube 193 and along the length of the two reflectors on opposite sides of tube 193.

A mounting block 200 shown in FIGS. 20 and 21 as well as FIGS. 2 and 3 is bolted to the mounting plate 181 and is also securely fixed, as by set screws, to the shaft 189. The mounting plate 200 then receives tube mounting assembles such as the tube mounting assembly 210 for mounting the ultraviolet lamps such as lamp 183. Note that a similar identical subassembly is contained at the opposite end of the oven (not shown). Mounting assembly 210 may be any conventional type of mounting bracket for permitting electrical connection to the terminal end of an ultraviolet lamp.

The interior surface of the mounting plate 181 is then fixed to reflector support brackets 220 and 221 which are identically constructed and which serve to receive the reflector assembles which will be later described in connection with FIGS. 17, 18 and 18*a*. Reflector brackets are elongated members where the bracket 220 is shown in detail in FIGS. 14, 15 and 16. These are made of steel and have end flanges 223 and 224 at their opposite ends for connection to the support or mounting bracket 181 and the other identical bracket at the opposite end of the oven. These brackets also serve as air channels, connected to an air inlet supply through tube 193 and inlet 171 (FIG. 3) for forcing air through the longitudinal slot between the active pair of reflectors. The air through this bracket is also useful for cooling the reflector.

Four reflectors which are each identical in construction are then connected to the reflector brackets in the manner shown best in FIGS. 2 and 3 for the four identical reflectors 230, 231, 232 and 233. The construction of the reflectors is shown typically in FIGS. 17, 18 and 18*a* for the reflector 230. Thus, the reflector consists of a generally parabolically curved bracket member which may have fixed to the interior thereof a reflector member 235 which may be of an Alzac type reflection material or the like. If desired, the reflector 235 can be replaced by polishing the interior surface of the reflector bracket. The ultraviolet lamp associated with each of reflectors 230 to 233 are located generally along the focus of their respective reflector.

Alzac reflector inserts, such as section 236, define an air slot between adjacent reflectors. The slot formed between adjacent sections 236 receives an air stream from the conduit connected to air inlet 171 and tube 193 (FIG. 2).

The back surfaces of the reflector supports 230 to 233 may contain projections or fins such as fins 237 and 238 increasing the available surface area of the reflectors for cooling.

Figures 17, 18, 18A:
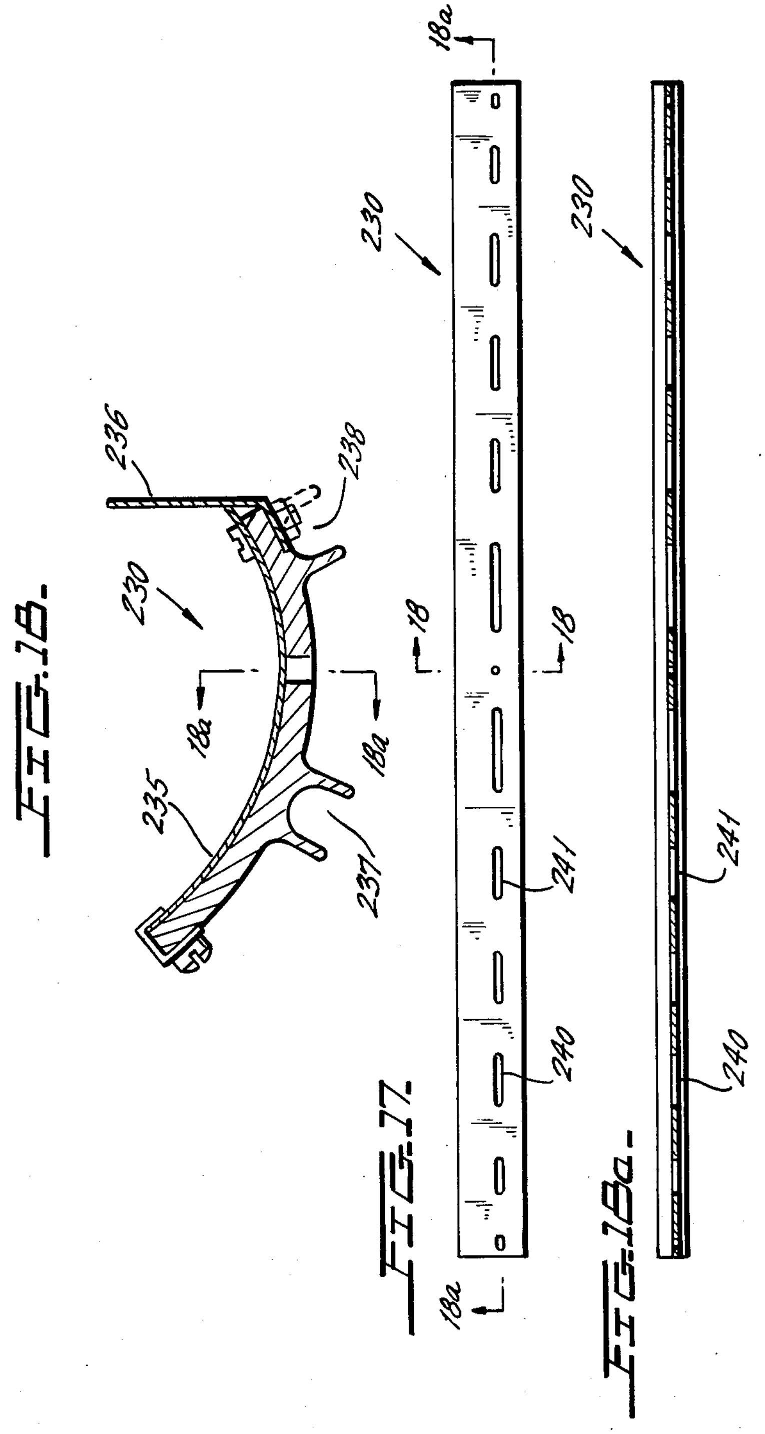
FIG. 17 is a top view of one-half of the reflector assembly.
FIG. 18 is a cross-sectional view of FIG. 17 taken across the section line 18—18 in FIG. 17.
FIG. 18*a* is a cross-sectional view of FIG. 18 taken across the section line 18*a*-18*a* in FIG. 18.

The reflector bodies 230 to 233 are provided with air passage slots such as the slots 240 and 241 best seen in FIGS. 17 and 18*a* and these slots allow air passage to prevent heat buildup on the lamp side of the reflector.

From the above, the solid reflector assembly consisting of the four reflectors 230 to 233; the support brackets 220, 221; the mounting plate 181 and a similar mounting plate at the other end of the assembly; the mounting bracket 200 and a similar mounting bracket at the other end of the assembly; and the shaft 189 and a similar shaft at the other end of the assembly, are rotatably mounted on the side walls of the oven so that the entire assembly can assume either the position shown or a position which is rotated 180° from the position shown. The adjustment of the angular position of the rotating assembly is obtained through a rotating handle 250*a* having a knob 251 which is fixed to the end of the shaft 189 which extends through the rotatable mounting bearing 190. The adjusted position of the operating handle 250*a* is fixed by detents such as the detent 252 in the side wall 64 (FIG. 3) which detent receives a plunger 253 fixed to the handle 250*a*. A similar detent is located in other positions to which the handle 250*a* rotates in order to rotate the lamp assembly 180 to maintenance or inspection positions.

As pointed out previously, a pin chain 40 carrying cans to be cured enters into the oven through the opening 170 in side wall 64 and exits from the oven through a similar opening in the opposite side wall. The pin chain 40 and cans 41 are shown in FIGS. 2 and 3 where the cans 41 are disposed on the rotatable pins 250. One pin 250 is shown in detail in FIG. 2 and consists of an outer rotating shell 251 which is rotatably mounted on a central support pin 252 by the bearing surfaces 253 and 254. An outer collar 255 on the rotating sleeve 251 bears against a wire brush 260 of steel or other suitable material carried in a brush holder 261. The brush 260 and the brush holder 261 extend along the full length of the oven. Thus, as the pins pass through the oven their bushings 255 roll on the wire brush 260 causing the pins to rotate thereby causing the cans supported by the pins to rotate. Note that the use of the wire brush 260 permits independent pressure contact between the wire brush 260 and the bushing 255 of each pin of the pin chain.

The wire brush support 261 is fixed to an elongated bracket 270 (FIG. 2) which is fixed to the main support bracket 53 as by bolts 271 and 272. This bracket also supports the upper chain guide 280 and the lower chain guide 281 which define between them a narrow slot which receives the chain 40 and guides its motion through the oven and thus guides the translational movement of the rotating pins of the pin chain 40.

The axial position of the cans 41 within the oven is controlled by the elongated guide tube 290 (FIG. 2) which is supported from a bracket 291 fixed to the wire support member 261. If desired, air can be introduced into the interior of conduit 290 to be directed through spaced openings toward the wire brush 260 and chain 40 for cooling.

A second elongated air conduit 293 is located as shown in FIG. 2, along the length of the oven and supported by a bracket 294. The conduit 293 will have spaced openings along its length to direct an air curtain toward the bottom of the cans 41 in order to provide a force to maintain the cans against the stop member 290 in their movement through the oven.

In operation it will be seen that the cans 41 to be cured move directly under the two lamps 300 and 301 in FIG. 2 which have their output radiation focused by reflector assemblies 232 and 233, respectively toward the surface of can 41 which is to be cured.

If there is a failure of a lamp or power supply, the handle 250*a* is quickly operated to cause the entire assembly 180 to rotate about the axis of the shaft 189 (and its companion shaft at the other end of the oven) in order to bring the lamps 302 and 187 into the position occupied in FIG. 2 by the lamps 300 and 301. The system can then be immediately restarted and the lamps 300 and 301 can be removed at a later time. Thus, the entire can line does not have to come to a stop to replace lamps or the like. Note that the lamps can be easily reached since the entire side wall 44 can be opened and the operator need only manipulate the handle 250 to present the lamps to be replaced for easy access.

During the operation of the system the air flow through the oven will be different depending on whether the lamps are operating at full power or at standby power. Thus, at full power, it is desired to cool the lamps and reflectors, but during standby when power to the lamps is reduced, over-cooling of the lamps might cause them to extinguish. Therefore, different cooling conditions must apply during the two different conditions.

An exhaust fan system is connected both to the plenum 140 at the top of the oven and to the bottom plenum connection 160 at the bottom of the oven.

In the preferred embodiment of the invention, air will be exhausted from only one or the other of these plenums at any one time depending on whether the lamp system is operated at full power or at low power and standby power.

When the lamps are operating at full power, the damper which permits air exhaust from the lower plenum 46 is closed so that air exhaust takes place only through the upper plenum 140. In this mode of operation, air is brought into the side chambers 130 and 131 defined between the outer walls 70 and 90 and the inner walls 77 and 91, respectively, and then generally follows the path taken by the arrows 310 to 316 with the air moving down along the outer walls of the oven and then up through the center of the oven and around the lamp regions. This air then removes ozone and produces the desired cooling of the outer oven walls and of the lamps and reflectors. In addition, air flow is produced through the slot between reflector sections 236-236 of the reflectors 232 and 233 to produce a positive air pressure down on the cans 41 moving beneath the reflector. This air also returns upwardly through the upper plenum 140.

During a reduced power, standby condition, it is desired that the air flow across the lamps be reduced to prevent extinguishing the lamp by undue cooling, but it is still necessary to remove ozone from the oven volume. Accordingly, during standby conditions, air exhaust through the upper plenum 140 is discontinued by closing its damper and the damper in plenum 46 is opened to permit air exhaust through the lower plenum 46 and its outlet 160. Under this condition, air flow coming down the channels 130 and 131 will simply continue into the lower plenum 46 and then out the exhaust section 160. This removes air flow from the lamps and thus prevents the undue cooling of the lamps. Note, however, that air flow stills comes through the slot produced between members 236 of the reflectors 232 and 233 to mainly supply cooling for the cans on the pin chain. Clearly over configurations can be used.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. An ultraviolet curing oven for curing decorations on a cylindrical object; said oven comprising an elongated chamber having openings in its opposite ends for receiving a continuously moving pin chain having cylindrical objects thereon which have ultraviolet curable fluid on their outer surfaces; object rotating means for continuously rotating said cylindrical objects while they move along the length of said oven; first and second elongated lamp means and first and second coextensive reflector means therefor disposed within said oven and extending along the length of said oven; rotatable mounting means coextensive with and receiving said first and second lamp means and their respective reflector means and rotatable about an axis which is parallel to the axes of said first and second lamp means and which is disposed between the spaced axes of said first and second lamp means; said rotatable mounting means operable for alternately positioning only one of said lamp means in operative relationship with respect to said cylindrical objects with the radiation of only said one of said lamp means directed towards said cylindrical objects while the other of said lamp means is out of operative relationship with said cylindrical objects; each of said lamp means being movable to a maintenance position where they are easily accessible; first air inlet means at one end of said chamber; means defining first and second conduits operatively secured to said rotatable mounting means and extending longitudinally of said first and second reflector means, respectively; said conduits having opening means for directing said air to cool said reflector means; said rotatable mounting means also operable for alternately positioning only one of said conduits in operative position with said first air inlet means for cooling the reflector means of said lamp means that is in operative relationship with said cylindrical objects.

2. The oven of claim 1 wherein said first and second reflector means are disposed on opposite sides of the axis of rotation of said rotatable mounting means and are oriented to focus the radiation of their respective lamp means in opposite directions.

3. The oven of claim 1 wherein the lateral side of said oven is openable to provide access to the interior of said oven.

4. The oven of claim 1 wherein said first and second lamp means are energized only when they are in their said operative relationship with said cylindrical objects.

5. The oven of claim 1 wherein each of said first and second lamp means includes first and second lamps each having an individual reflector of said reflector means positioned with an air slot therebetween for flow of cooling air received from said first air inlet means.

6. The oven of claim 1, 2 or 3 wherein said object rotating means includes a respective rotatable pin for supporting each cylindrical object and an elongated high temperature resistant, stiff wire brush which extends the length of said oven and engages each of the pins moving therethrough to cause said pins to rotate over said brush.

7. The oven of claim 1, 2 or 3 which further includes a source of air for moving air through and out of said oven; at least two side walls of said oven having respective interior panels 'spaced therefrom and forming a channel for the flow of air from said source and for insulating said side walls from the internal heat of said oven.

8. An ultraviolet curing oven for curing decorations on a cylindrical object; said oven comprising an elongated chamber having openings in its opposite ends for receiving a continuously moving pin chain having cylindrical objects thereon which have ultraviolet curable fluid on their outer surfaces; object rotating means for continuously rotating said cylindrical objects while they move along the length of said oven; first and second elongated lamp means and first and second coextensive reflector means therefor disposed within said oven and extending along the length of said oven; rotatable mounting means coextensive with and receiving said first and second lamp means and their respective reflector means and rotatable about an axis which is parallel to the axes of said first and second lamp means and which is disposed between the spaced axes of said first and second lamp means; said rotatable mounting means operable for alternately positioning only one of said lamp means in operative relationship with respect to said cylindrical objects with the radiation of only said one of said lamp means directed towards said cylindrical objects while the other of said lamp means is out of operative relationship with said cylindrical objects; each of said lamp means being movable to a maintenance position where they are easily accessible; an air conduit which extends along the length of said oven and is spaced from the free ends of said cylindrical objects; said air conduit having openings facing said cylindrical objects whereby air jets are directed at said free ends of said cylindrical objects to tend to hold said cans on their respective pins.

9. The oven of claim 4 which further includes an air conduit which extends along the length of said oven and is spaced from the free ends of said cylindrical objects; said air conduit having openings facing said cylindrical objects whereby air jets are directed at said free ends of said cylindrical objects to tend to hold said cans on their respective pins.

10. The oven of claim 8 which further includes an elongated side guide which engages the end of said cylindrical objects which is opposite their free end.

11. An ultraviolet curing oven as set forth in claims 10, 8, or 12 wherein said object rotating means includes a respective rotatable pin for supporting each cylindrical object and an elongated steel wire brush which extends the length of said oven and engages each of the pins moving therethrough to cause said pins to rotate over said brush.

12. The oven of claim 13 wherein a lateral side of said oven is openable to provide easy access to the interior of said oven.

* * * * *